(12) United States Patent
Ando

(10) Patent No.: US 11,544,563 B2
(45) Date of Patent: Jan. 3, 2023

(54) DATA PROCESSING METHOD AND DATA PROCESSING DEVICE

(71) Applicant: OLYMPUS CORPORATION, Hachioji (JP)

(72) Inventor: Jun Ando, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 294 days.

(21) Appl. No.: 16/905,539

(22) Filed: Jun. 18, 2020

(65) Prior Publication Data

US 2020/0320393 A1 Oct. 8, 2020

Related U.S. Application Data

(63) Continuation of application No. PCT/JP2017/045573, filed on Dec. 19, 2017.

(51) Int. Cl.
*G06N 3/04* (2006.01)
*G06N 3/08* (2006.01)

(52) U.S. Cl.
CPC ............ *G06N 3/08* (2013.01); *G06N 3/0454* (2013.01)

(58) Field of Classification Search
CPC .......... G06N 3/08; G06N 3/0454; G06N 3/02; G06N 3/0463; G06N 3/04; G06N 3/0445
See application file for complete search history.

(56) References Cited

U.S. PATENT DOCUMENTS

| | | | |
|---|---|---|---|
| 6,449,591 B1* | 9/2002 | Kondo | G06V 40/16 704/211 |
| 9,552,536 B2 | 1/2017 | Ando | |
| 2008/0279460 A1 | 11/2008 | Kasahara et al. | |
| 2011/0170769 A1 | 7/2011 | Sakimura et al. | |
| 2011/0176725 A1 | 7/2011 | Homma et al. | |

(Continued)

FOREIGN PATENT DOCUMENTS

| | | |
|---|---|---|
| JP | H04158482 A | 6/1992 |
| JP | H05280948 A | 10/1993 |

(Continued)

OTHER PUBLICATIONS

International Preliminary Report on Patentability (IPRP) (and English language translation thereof) dated Jun. 23, 2020 issued in International Application No. PCT/JP2017/045573.

(Continued)

*Primary Examiner* — John J Lee
(74) *Attorney, Agent, or Firm* — Holtz, Holtz & Volek PC

(57) ABSTRACT

A data processing device applies a first convolutional neural network layer to pieces of data included in a mini-batch to obtain a first feature map of each of the pieces of data, independently calculates a first statistic for each of the pieces of data based on the first feature maps, calculates a normalization parameter for each of the pieces of data based on the first statistic of each of the pieces of data and a cumulative statistic, normalizes the first feature map of each of the pieces of data by using a normalization parameter of each of the pieces of data to obtain a normalized feature map of each of the pieces of data, and applies a second convolutional neural network layer to the normalized feature map of each of the pieces of data to obtain a second feature map of each of the pieces of data.

15 Claims, 4 Drawing Sheets

(56) References Cited

U.S. PATENT DOCUMENTS

| | | | |
|---|---|---|---|
| 2015/0331832 A1 | 11/2015 | Minoya et al. | |
| 2016/0217368 A1 | 7/2016 | Ioffe et al. | |
| 2019/0083180 A1 | 3/2019 | Ichiki | |
| 2019/0138838 A1* | 5/2019 | Liu | G06N 3/02 |
| 2019/0164037 A1* | 5/2019 | Kim | G06N 3/0454 |
| 2020/0012932 A1* | 1/2020 | Wang | G06N 3/08 |
| 2020/0012942 A1 | 1/2020 | Ioffe et al. | |
| 2020/0057924 A1 | 2/2020 | Ioffe et al. | |
| 2020/0234127 A1 | 7/2020 | Ioffe et al. | |
| 2021/0117651 A1 | 4/2021 | Kotake | |
| 2021/0142512 A1 | 5/2021 | Ando | |

FOREIGN PATENT DOCUMENTS

| | | | |
|---|---|---|---|
| JP | 2008282267 A | 11/2008 | |
| JP | 2011145791 A | 7/2011 | |
| JP | 2011150541 A | 8/2011 | |
| JP | 2015215837 A | 12/2015 | |
| JP | 2017164007 A | 9/2017 | |
| JP | 2019003396 A | 1/2019 | |
| JP | 2019159958 A | 9/2019 | |
| WO | 2016123409 A1 | 8/2016 | |

OTHER PUBLICATIONS

International Search Report (ISR) (and English language translation thereof) dated Mar. 13, 2018 issued in International Application No. PCT/JP2017/045573.

Ioffe, et al., "Batch Normalization: Accelerating Deep Network Training by Reducing Internal Covariate Shift", arXiv:1502.03167v3 [cs.LG] Mar. 2, 2015, pp. 1-11.

International Search Report (ISR) (and English translation thereof) dated Feb. 10, 2020, issued in International Application No. PCT/JP2019/046692.

International Preliminary Report on Patentability (IPRP) (and English language translation thereof) dated Feb. 16, 2021 issued in International Application No. PCT/JP2018/030119.

International Search Report (ISR) (and English translation thereof) dated Nov. 13, 2018 issued in International Application No. PCT/JP2018/030119.

International Search Report (ISR) dated Jun. 3, 2014 issued in International Application No. PCT/JP2014/056886.

U.S. Appl. No. 17/151,719, First Named Inventor: Jun Ando; Title: "Image Processing Method and Image Processing Apparatus"; Filed: Jan. 19, 2021.

U.S. Appl. No. 17/569,205, First Named Inventor: Jun Ando; Title: "Image Processing Method, Training Device, and Image Processing Device"; Filed: Jan. 5, 2022.

Krizhevsky, et al., "Imagenet Classification with Deep Convolutional Neural Networks", Advances in neural information processing systems 25, pp. 1097-1105, (2012). Retrieved at URL: https://proceedings.neurips.cc/paper/2012/file/c399862d3b9d6b76c8436e924a68c45b-Paper.pdf.

Matsuoka, et al., "Deep similarity metric learning with unsupervised learning", The 79th National Convention of IPSJ, "2.1 Feature Extraction Unit", pp. 2-383 to 2-384, Mar. 16, 2017.

Ren, et al., "Faster R-CNN: Towards Real-Time Object Detection with Region Proposal Networks", Conference on Neural Information Processing Systems (NIPS), 2015.

* cited by examiner

INPUT MINI-BATCH

SECOND FEATURE MAP

DATA PROCESSING METHOD AND DATA PROCESSING DEVICE

CROSS-REFERENCE TO RELATED APPLICATIONS

This application is based upon and claims the benefit of priority from International Application No. PCT/JP2017/045573, filed on Dec. 19, 2017, the entire contents of which is incorporated herein by reference.

BACKGROUND OF THE INVENTION

1. Field of the Invention

The present invention relates to a data processing method and a data processing device.

2. Description of the Related Art

In recent years, data processing using deep learning has attracted attention. One of the models for deep learning is a convolutional neural network (CNN). Non-patent document 1 discloses a technique of performing normalization for each of mini-batches in an intermediate layer of the convolutional neural network. According to the technique described in non-patent document 1, learning convergence performance and generalization performance to unknown images are improved.

[non-patent document 1] Sergey Ioffe, Christian Szegedy, "Batch Normalization: Accelerating Deep Network Training by Reducing Internal Covariate Shift", arXiv: 1502.03167 (2015)

The conventional technique described in non-patent document 1 uses the mean and the standard deviation of all the data included in the mini-batch as the statistics to be used for normalizing each of pieces of data included in the mini-batch, making it difficult to proceed with the normalization process independently for individual pieces of data. This hinders further improvement of the learning speed.

SUMMARY OF THE INVENTION

The present invention has been made in view of such circumstances and aims to provide a technique capable of achieving a further improvement in learning speed in data processing using a neural network.

In order to solve the above problems, a data processing method according to an aspect of the present invention includes: applying a first CNN, the applying of the first CNN including applying a first convolutional neural network layer to each of pieces of data of a mini-batch including one or more pieces of data and outputting a first feature map of each of the pieces of data; independently calculating a first statistic of each of the pieces of data included in the mini-batch based on the first feature map of each of the pieces of data; calculating a normalization parameter for each of the pieces of data included in the mini-batch based on the first statistic of each of the pieces of data and a cumulative statistic; applying normalization, the applying normalization including normalizing the first feature map of each of the pieces of data included in the mini-batch by using a normalization parameter of each of the pieces of data and outputting a normalized feature map of each of the pieces of data; and applying a second CNN, the applying of the second CNN including applying a second convolutional neural network layer to the normalized feature map of each of the pieces of data included in the mini-batch and outputting a second feature map of each of the pieces of data.

Another aspect of the present invention is a data processing device. This device includes: a first CNN application unit that applies a first convolutional neural network layer to each of pieces of data of a mini-batch including one or more pieces of data and output a first feature map of each of the pieces of data; a first statistic calculation unit that independently calculates a first statistic of each of the pieces of data included in the mini-batch based on the first feature map of each of the pieces of data; a normalization parameter calculation unit that calculates a normalization parameter for each of the pieces of data included in the mini-batch based on the first statistic of each of the pieces of data and a cumulative statistic; a normalization application unit that normalizes the first feature map of each of the pieces of data included in the mini-batch by using a normalization parameter of each of the pieces of data and output a normalized feature map of each of the pieces of data; and a second CNN application unit that applies a second convolutional neural network layer to the normalized feature map of each of the pieces of data included in the mini-batch and output a second feature map of each of the pieces of data.

Note that any combination of the above constituent elements, and representations of the present invention converted between a method, a device, a system, a recording medium, a computer program, or the like, are also effective as an aspect of the present invention.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

A data processing device according to an embodiment executes a "learning process" of performing a convolutional neural network learning based on a large number of pieces of data and the ground truth corresponding to the data, and an "application process" of performing predetermined data processing by applying the learned convolutional neural network to test data.

In the learning process, the data processing device independently performs a normalization process in at least one normalization layer of the convolutional neural network for individual pieces of data included in a mini-batch. Specifically, the data processing device performs a normalization process on each of pieces of data included in a currently processed mini-batch independently for individual pieces of data on the basis of the statistics (mean and standard deviation) calculated independently for individual pieces of data included in the currently processed mini-batch and the cumulative statistics (mean and standard deviation), that is, statistics based on the data included in the mini-batch processed so far. With this configuration, the normalization process in the normalization layer can be independently performed for individual pieces of data while maintaining the generalization performance. That is, the normalization process in the normalization layer can be executed in parallel while maintaining the generalization performance.

Figure 1:
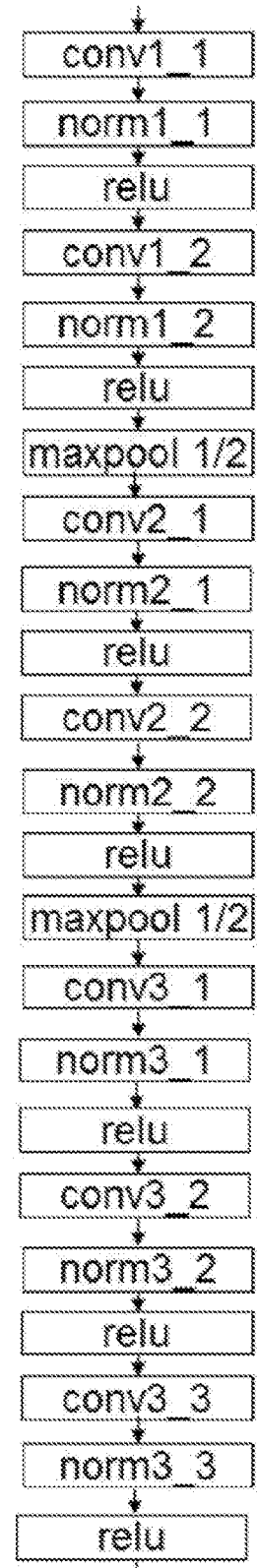
FIG. 1 is a diagram illustrating a model of a convolutional neural network.
Figure 1:
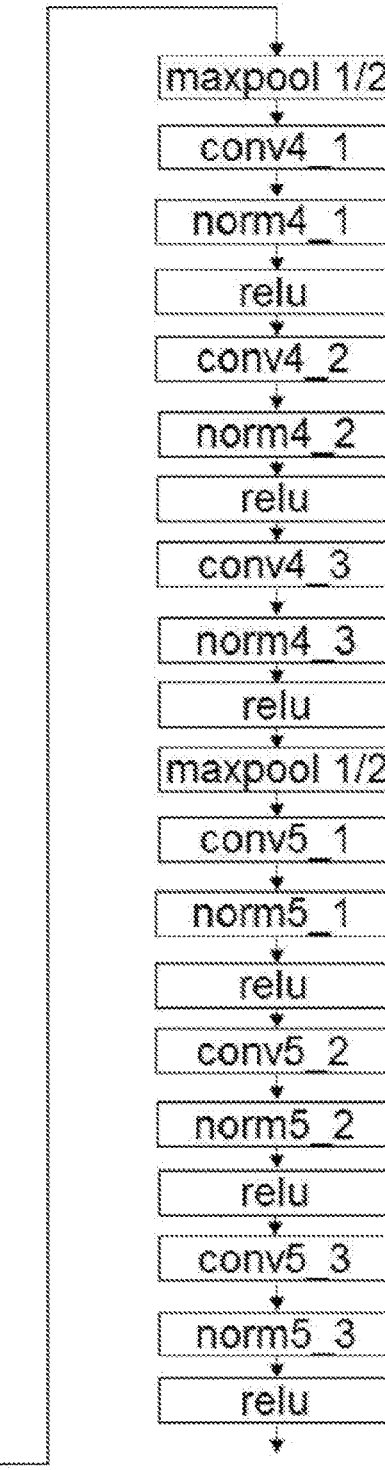

In the present embodiment, the data processing device executes a convolutional neural network based on a model referred to as VGG-16, illustrated in FIG. 1. In FIG. 1, conv, norm, relu, and maxpool represent a convolutional layer, a normalization layer, an activation layer, and a maximum pooling layer, respectively.

The following description focuses on one of a plurality of the normalization layers. The normalization layer of interest will be referred to as a normalization layer of interest, the layer before the normalization layer of interest will be referred to as a first convolutional neural network layer, and the layer after the normalization layer of interest as a second convolutional neural network layer.

Figure 2:
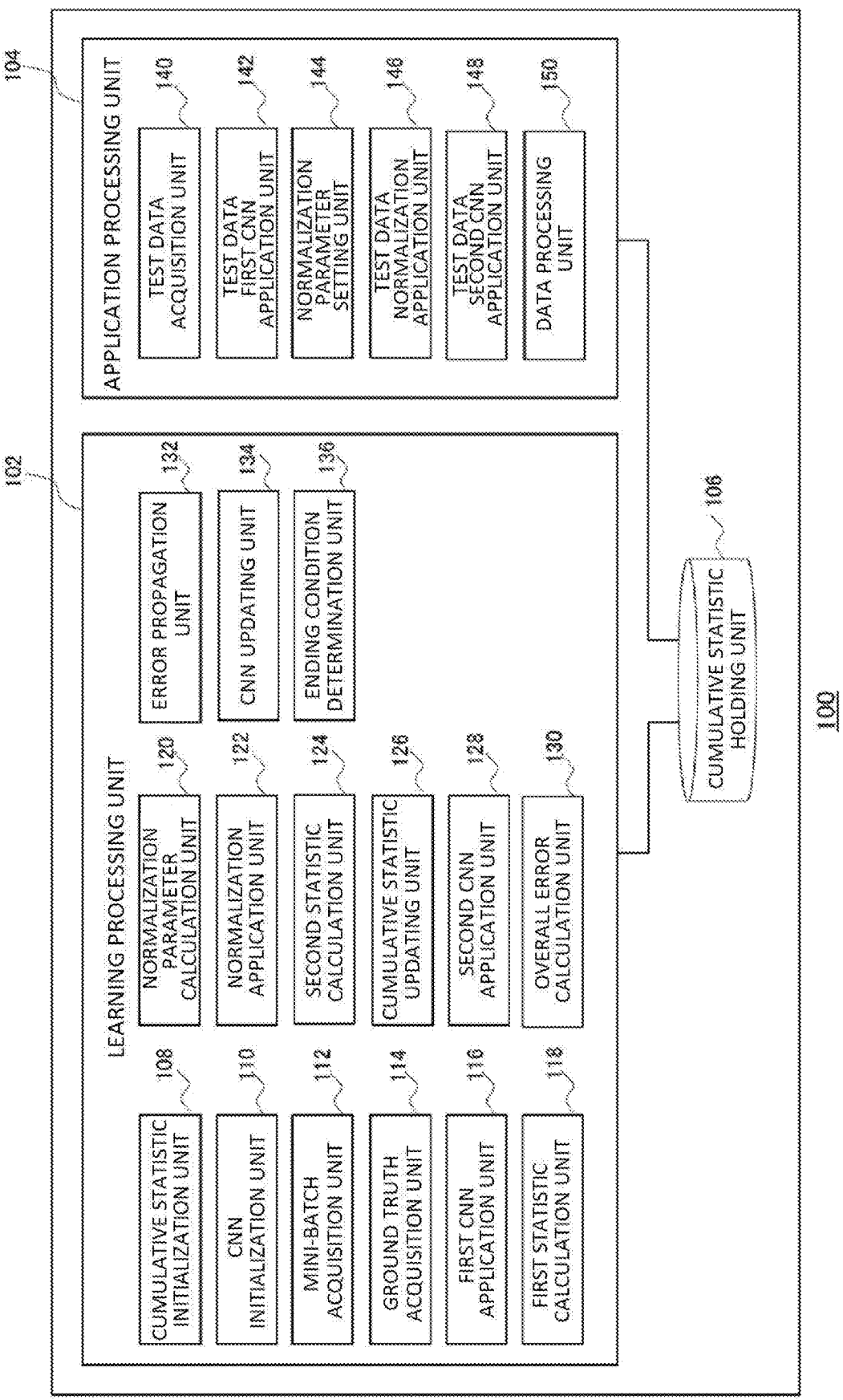
FIG. 2 is a block diagram illustrating a functional configuration of a data processing device according to an embodiment.

FIG. 2 is a block diagram illustrating a functional configuration of a data processing device 100 according to an embodiment. Each of blocks illustrated here can be implemented by elements or mechanical device such as a central processing unit (CPU) and a Graphics Processing Unit (GPU) of a computer in terms of hardware, and can be implemented by a computer program in terms of software. However, functional blocks implemented by cooperation of hardware and software are depicted here. This makes it possible to implement these functional blocks in various forms by the combination of hardware and software, which is to be understandable by those skilled in the art.

The data processing device 100 includes a learning processing unit 102 that executes a learning process, an application processing unit 104 that executes an application process, and a cumulative statistic holding unit 106.

Hereinafter, an exemplary case of applying the data processing device 100 to image processing will be described. However, it will be understood by those skilled in the art that the data processing device 100 can also be applied to voice recognition processing, natural language processing, and other processes.

The learning processing unit 102 repeatedly executes learning in units of mini-batches. The learning processing unit 102 includes: a cumulative statistic initialization unit 108; a CNN initialization unit 110; a mini-batch acquisition unit 112; a ground truth acquisition unit 114; a first CNN application unit 116 that executes a process of each of layers of the first convolutional neural network layer; a first statistic calculation unit 118; a normalization parameter calculation unit 120; a normalization application unit 122 that executes processing on the normalization layer of interest; a second statistic calculation unit 124; a cumulative statistic updating unit 126; a second CNN application unit 128 that executes processing on each of layers of the second convolutional neural network layer; an overall error calculation unit 130; an error propagation unit 132; a CNN updating unit 134; and an ending condition determination unit 136.

Triggered by the start of learning based on a user's instruction, the cumulative statistic initialization unit 108 initializes the cumulative statistic held in the cumulative statistic holding unit 106. In the present embodiment, the cumulative statistic initialization unit 108 sets "0" as an initial value of the cumulative statistic obtained by accumulating the mean, and sets "1" as an initial value of the cumulative statistic obtained by accumulating standard deviations.

Triggered by the start of learning based on the user's instructions, the CNN initialization unit 110 initializes a weighting factor of a convolutional layer of the convolutional neural network (that is, a first convolutional neural network layer and a second convolutional neural network layer described below). Specifically, the CNN initialization unit 110 uses a normal random number with the mean 0 and the standard deviation wscale/$\sqrt{(c_i \times k \times k)}$ in initialization. In this expression, wscale is a scale parameter, $c_i$ is the number of input channels of the convolutional layer, and k is the convolution kernel size. Furthermore, a weighting factor of the convolutional layer that has been trained by a large-scale image DB different from an image DB used for the current learning may be used as an initial value of the weighting factor of the convolutional layer. This makes it possible to achieve high-performance convolutional neural network learning even when the number of images used for learning is small.

From among a large number of images prepared in advance, the mini-batch acquisition unit 112 acquires a predetermined number of images, that is, one or more (a plurality in the present embodiment) images to be used in one learning process (hereinafter, a collection of these images will be referred to as a "mini-batch").

The ground truth acquisition unit 114 acquires the ground truth corresponding to each of images acquired by the mini-batch acquisition unit 112, from among a large number of pieces of ground truth prepared in advance. The ground truth corresponds to a binary value indicating whether a classification category target is included in the image in a case where the data processing device 100 is used for image classification, corresponds to a binary value indicating whether a detection target is included in each of candidate frames corresponding to each of points on the image in a case where the data processing device 100 is used for object detection, and corresponds to an image of an ideal transform result in a case where the data processing device 100 is used for image transform.

The first CNN application unit 116 applies the first convolutional neural network layer to each of images included in the mini-batch, that is, executes the processing on each of layers included in the first convolutional neural network layer to output a feature map of each of the images. Hereinafter, the feature map output by application of the first convolutional neural network layer is referred to as a "first feature map".

The first statistic calculation unit 118 independently calculates the statistic of each of images (hereinafter, referred to as a "first statistic") from the first feature map of each of images included in the mini-batch. In the present embodiment, the first statistic calculation unit 118 calculates the mean new and the standard deviation $\sigma_{new}$ of the first feature map of the corresponding image, as the first statistic. Specifically, the mean $\mu_{new}$ and the standard deviation $\sigma_{new}$ are calculated by using Formulas (1) and (2), respectively.

[Formula 1]

$$\mu_{new}(b, c) = \frac{1}{WH}\sum_{y}^{H}\sum_{x}^{W} I(b, c, y, x) \quad \text{(Formula 1)}$$

[Formula 2]

$$\sigma_{new}(b, c) = \sqrt{\frac{1}{WH}\sum_{y}^{H}\sum_{x}^{W}\{I(b, c, y, x) - \mu_{new}(b, c)\}^2} \quad \text{(Formula 2)}$$

Here, I is the first feature map, W and H are the width and height of the first feature map, and x, y, c, and b are the subscript of width, subscript of height, subscript of the number of channels, and subscript of the index number of mini-batch images, respectively, in the first feature map.

The normalization parameter calculation unit 120 calculates a normalization parameter which is a parameter used for calculating the first feature map of each of images included in the mini-batch based on the first statistic of each of the images and the cumulative statistic held in the cumulative statistic holding unit 106. First, the normalization parameter calculation unit 120 calculates rounded statistic differences d and r obtained by rounding the difference or ratio between the first statistic (mean new and standard deviation $\sigma_{new}$) and the cumulative statistic (mean gold and standard deviation $\sigma_{old}$) so as to fall within a statistic difference range $d_{max}$ and $r_{max}$, respectively. The statistic difference ranges $d_{max}$ and $r_{max}$ are individually determined experimentally or empirically.

Specifically, the rounded statistic differences d and r are calculated by using Formulas (3) and (4), respectively.

[Formula 3]

$$d(b, c) = \mathop{clip}_{[-d_{max}, d_{max}]}\left(\frac{\mu_{new}(b, c) - \mu_{old}(c)}{\sigma_{old}(c)}\right) \quad \text{(Formula 3)}$$

[Formula 4]

$$r(b, c) = \mathop{clip}_{[1/r_{max}, r_{max}]}\left(\frac{\sigma_{new}(b, c)}{\sigma_{old}(c)}\right) \quad \text{(Formula 4)}$$

Next, the normalization parameter calculation unit 120 calculates the normalization parameters $\mu$ and $\sigma$ of each of images on the basis of the first statistic of each of images included in the mini-batch and the rounded statistic differences. Specifically, the normalization parameters $\mu$ and $\sigma$ are calculated by using Formulas (5) and (6), respectively.

[Formula 5]

$$\mu(b, c) = \mu_{new}(b, c) - \frac{\sigma_{new}(b, c)d(b, c)}{r(b, c)} \quad \text{(Formula 5)}$$

[Formula 6]

$$\sigma(b, c) = \frac{\sigma_{new}(b, c)}{r(b, c)} \quad \text{(Formula 6)}$$

The statistic difference ranges $d_{max}$ and $r_{max}$ are changed in accordance with the number of times of iterations of learning. In other words, the statistic difference ranges $d_{max}$ and $r_{max}$ are changed in accordance with the number of times of iterations of a series of processes performed by the mini-batch acquisition unit 112, the ground truth acquisition unit 114, the first CNN application unit 116, the first statistic calculation unit 118, the normalization parameter calculation unit 120, the normalization application unit 122, the cumulative statistic updating unit 126, the second CNN application unit 128, the overall error calculation unit 130, the error propagation unit 132, and the CNN updating unit 134. Specifically, the cumulative statistics fluctuate greatly and are unstable at a point where the number of times of iterations is small, and thus the statistic difference range is narrowed so that the normalization parameter is close to the first statistic; at a point where the number of times of iterations is large, the statistic difference range is increased so that the normalization parameter is close to the cumulative statistics in order to improve the generalization performance by using the statistics calculated from a large number of mini-batches. That is, the greater the number of times of iterations, the wider the setting of the statistic difference range. As an example, the statistic difference range may be increased in proportion to the number of times of iterations.

As a modification, it is also allowable for the normalization parameter calculation unit 120 to calculate the normalization parameters $\mu$ and $\sigma$ of each of images included in the mini-batch by using a weighted sum of the first statistic of each of images and the cumulative statistic, specifically, by using the Formulas (7) and (8), respectively.

[Formula 7]

$$\mu_2(b,c) = \mu_{new}(b,c) \times w_s + \mu_{old}(c) \times (1-w_s) \quad \text{(Formula 7)}$$

[Formula 8]

$$\sigma_2(b,c) = \sigma_{new}(b,c) \times w_s + \sigma_{old}(c) \times (1-w_s) \quad \text{(Formula 8)}$$

Here, $w_s$ is a weight of the first statistic, and $(1-w_s)$ is a weight of the cumulative statistic. Similarly to the statistic difference range, the cumulative statistics fluctuate greatly and are unstable at a point where the number of times of iterations is small, and thus the weight $w_s$ of the first statistic is set to be large (that is, the weight $(1-w_s)$ of the cumulative statistics is set to be small) so that the normalization parameter is close to the first statistic; at a point where the number of times of iterations is large, the weight $w_s$ of the first statistic is set to be small (that is, the weight $(1-w_s)$ of the cumulative statistics is set to be large) so that the normalization parameter is close to the cumulative statistics in order to improve the generalization performance by using statistics calculated from a larger number of mini-batches. That is, the larger the number of times of iterations, the smaller the setting of the weight $w_s$ of the first statistic (thus, the larger the setting of the weight $(1-w_e)$ of the cumulative statistic). As an example, the weight $w_s$ of the first statistic may be decreased (thus, the weight $(1-w_s)$ of the cumulative statistic may be increased) in proportion to the number of times of iterations.

The normalization application unit 122 normalizes the first feature map of each of images included in the mini-batch using the normalization parameter of each of the images to output the normalized feature map of each of the images. Specifically, the normalized feature map is calculated using Formula (9).

[Formula 9]

$$O(b, c, y, x) = \frac{I(b, c, y, x) - \mu(b, c)}{\sigma(b, c)} \times \gamma(c) + \beta(c) \quad \text{(Formula 9)}$$

Here, O is a normalized feature map, I is a first feature map, and γ and β are coefficients acquired by learning.

The second statistic calculation unit 124 calculates the statistic based on at least one image out of one or more images included in the mini-batch (hereinafter, referred to as a "second statistic"). In the present embodiment, the second statistic calculation unit 124 calculates the mean µ' and a standard deviation σ' of the first feature map of at least one of the one or more images included in the mini-batch, as the second statistic. Specifically, the mean µ' and the standard deviation σ' are calculated by using Formulas (10) and (11), respectively.

[Formula 10]

$$\mu'(c) = \frac{1}{WHB}\sum_{b}^{B}\sum_{y}^{B}\sum_{x}^{W} I(b, c, y, x)$$ (Formula 10)

[Formula 11]

$$\sigma'(c) = \sqrt{\frac{1}{WHB}\sum_{b}^{B}\sum_{y}^{H}\sum_{x}^{W} \{I(b, c, y, x) - \mu'(c)\}^2}$$ (Formula 11)

Here, B is the number of mini-batch images.

The cumulative statistic updating unit 126 updates the cumulative statistic held in the cumulative statistic holding unit 106 on the basis of the second statistic. In the present embodiment, as illustrated in Formulas (12) and (13), the cumulative statistic updating unit 126 updates the weighted sum of the second statistic and the cumulative statistic, as a new cumulative statistic.

[Formula 12]

$$\mu_{old}(c) \leftarrow \mu_{old}(c) \times w_d + \mu'(c) \times (1-w_d)$$ (Formula 12)

[Formula 13]

$$\sigma_{old}(c) \leftarrow \sigma_{old}(c) \times w_d + \sigma'(c) \times (1-w_d)$$ (Formula 13)

Here, $w_d$ is a weight of the cumulative statistic, and $(1-w_d)$ is a weight of the second statistic.

The second CNN application unit 128 applies the second convolutional neural network layer to the normalized feature map of each of images included in the mini-batch, that is, executes the processing of each of layers included in the second convolutional neural network layer to output the feature map of each of the images. Hereinafter, the feature map output by application of the second convolutional neural network layer is referred to as a "second feature map".

The overall error calculation unit 130 calculates an error of the overall process (hereinafter referred to as an "overall error") based on the second feature map.

The error propagation unit 132 calculates an error in each of processes of the first CNN application unit 116, the normalization application unit 122, and the second CNN application unit 128 based on the overall error.

The CNN updating unit 134 updates the first convolutional neural network layer and the second convolutional neural network layer based on the error calculated by the error propagation unit 132. The method used for updating the convolutional neural network on the basis of the error may be a stochastic gradient descent method, for example.

The ending condition determination unit 136 determines whether to end the learning by the learning processing unit 102. An ending condition, which is a condition for ending the learning is, for example, that the learning has been performed a predetermined number of times, or that an instruction to end the learning has been received from the outside. In a case where the ending condition is satisfied, the ending condition determination unit 136 ends the process of the learning processing unit 102. In a case where the ending condition is not satisfied, the ending condition determination unit 136 returns the process to the mini-batch acquisition unit 112.

The application processing unit 104 includes a test data acquisition unit 140, a test data first CNN application unit 142, a normalization parameter setting unit 144, a test data normalization application unit 146, a test data second CNN application unit 148, and a data processing unit 150.

The test data acquisition unit 140 acquires a test image. The normalization parameter setting unit 144 sets the cumulative statistic held in the cumulative statistic holding unit 106, that is, the cumulative statistic calculated by the learning process, as a normalization parameter.

The configuration of the test data first CNN application unit 142, the test data normalization application unit 146, and the test data second CNN application unit 148 are similar to the configurations of the first CNN application unit 116, the normalization application unit 122, and the second CNN application unit 128, respectively. The test data first CNN application unit 142 applies the first convolutional neural network layer to the test image to output a first feature map of the test image. The test data normalization application unit 146 normalizes the first feature map of the test image using the normalization parameter to output a normalized feature map of the test image. The test data second CNN application unit 148 applies the second convolutional neural network layer to the normalized feature map of the test image to output a second feature map of the test image.

The data processing unit 150 performs image processing such as image classification, object detection, or image transform on the test image based on the second feature map of the test image.

Operation of the data processing device 100 configured as above will be described.

Figure 3:
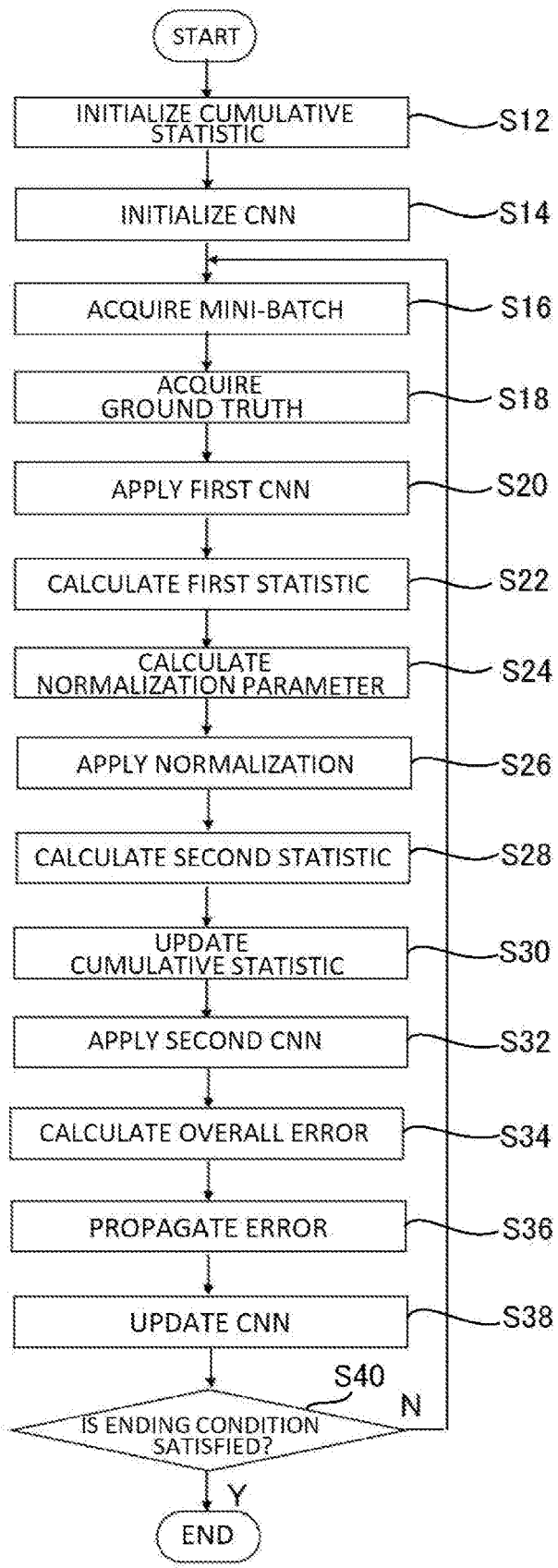
FIG. 3 is a flowchart illustrating an example of a learning process performed by the data processing device of FIG. 1.

FIG. 3 is a flowchart illustrating an example of a learning process performed by the data processing device 100. The cumulative statistic initialization unit 108 initializes the cumulative statistic (S12). The CNN initialization unit 110 initializes the first neural network and the second neural network (S14). The mini-batch acquisition unit 112 acquires a mini-batch (S16). The ground truth acquisition unit 114 acquires the ground truth corresponding to the mini-batch (S18). The first CNN application unit 116 applies the first neural network to each of images included in the mini-batch to output the first feature map of each of images (S20). The first statistic calculation unit 118 calculates the first statistic of each of images independently (for example, in parallel) from the first feature map of each of images (S22).

The normalization parameter calculation unit 120 calculates the normalization parameter of each of images based on the first statistic of each of images and the cumulative statistic (S24). The normalization application unit 122 normalizes the first feature map of each of images using the normalization parameter of each of images to output a normalized feature map of each of images (S26). The second statistic calculation unit 124 calculates the second statistic based on at least one image of the one or more images included in the mini-batch (S28). The cumulative statistic updating unit 126 updates the cumulative statistic on the basis of the second statistic (S30). The second CNN application unit 128 applies the second neural network to the normalized feature map of each of images to output the second feature map of each of images (S32). The overall error calculation unit 130 calculates the overall error based on the second feature map (S34). The error propagation unit 132 calculates an error in each of processes of the first CNN application unit 116, the normalization application unit 122, and the second CNN application unit 128 based on the overall error (S36). The CNN updating unit 134 updates the first convolutional neural network layer and the second convolutional neural network layer on the basis of the error calculated by the error propagation unit 132 (S38). The ending condition determination unit 136 determines whether the ending condition is satisfied (S40). In a case where the ending condition is not satisfied (N of S40), the process is returned to S16. In a case where the ending condition is satisfied (Y of S40), the process ends.

Figure 4:
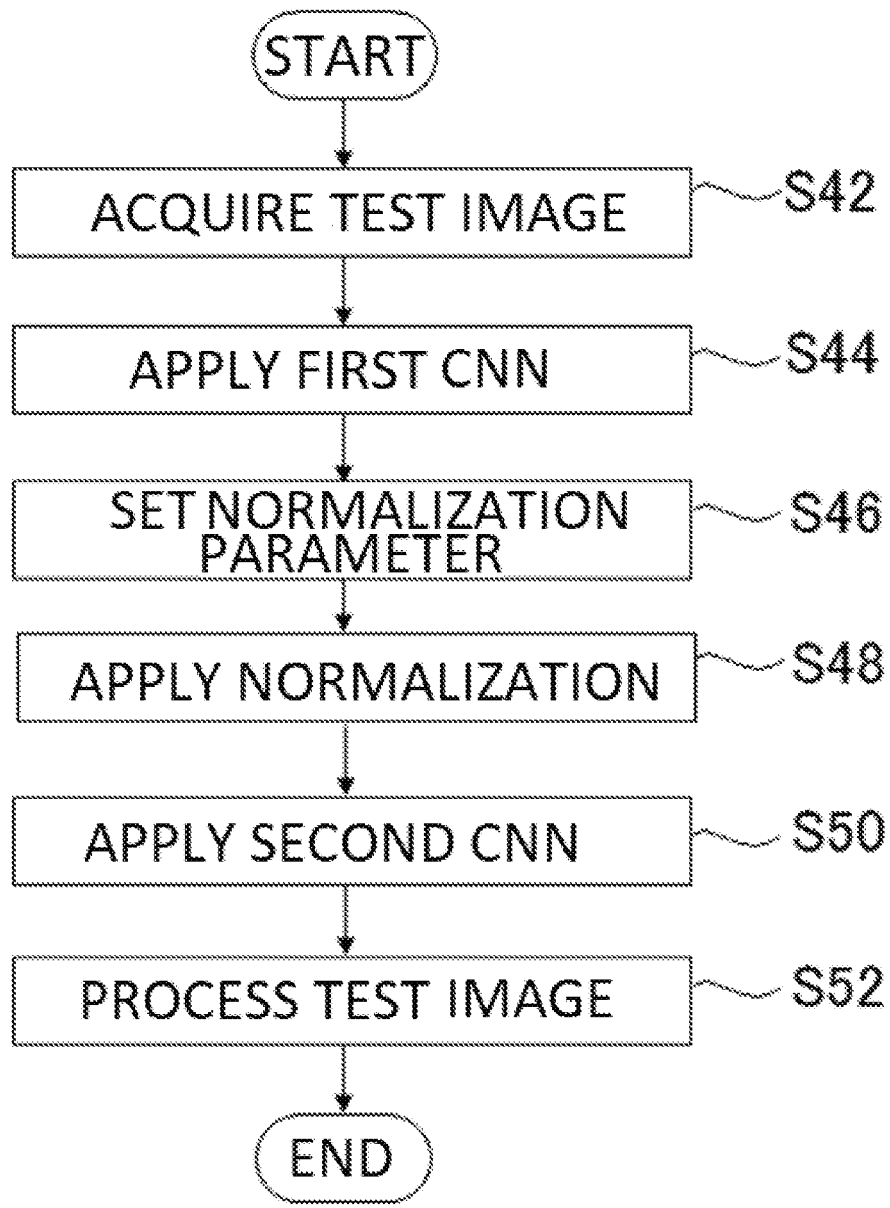
FIG. 4 is a flowchart illustrating an example of an application process performed by the data processing device of FIG. 1.

FIG. 4 is a flowchart illustrating an example of an application process performed by the data processing device 100. The test data acquisition unit 140 acquires a test image (S42). The first CNN application unit for test data 142 applies the first neural network to the test image to output a first feature map of the test image (S44). The normalization parameter setting unit 144 sets the cumulative statistic calculated in the learning process, as a normalization parameter (S46). The test data normalization application unit 146 normalizes the first feature map of the test image using the set normalization parameter to output a normalized feature map of the test image (S48). The second CNN application unit for test data 148 applies the second neural network to the normalized feature map of the test image to output a second feature map of the test image (S50). The data processing unit 150 performs image processing on the test image on the basis of the second feature map of the test image (S52).

The data processing device 100 according to the embodiment described above is capable of performing the normalization process in the normalization layer independently for individual pieces of data while maintaining the generalization performance. This makes it possible to achieve parallel execution of the normalization processes in the normalization layer, that is, the processes by the first statistic calculation unit 118, the normalization parameter calculation unit 120, and the normalization application unit 122. Furthermore, the processes by the first CNN application unit 116 and the second CNN application unit 128 can be independently performed for individual pieces of data by nature, and the process of calculation by the cumulative statistic updating unit 126 can be performed later by storing the first statistic calculated for individual pieces of data, for example. Therefore, with the use of the data processing device 100 according to the embodiment, it is possible to perform efficient parallel processing by preparing a plurality of Graphics Processing Units (GPUs) and allocating a plurality of pieces of data included in the mini-batch to execute each of processes.

The present invention has been described with reference to the embodiments. The present embodiment has been described merely for exemplary purposes. Rather, it can be readily conceived by those skilled in the art that various modification examples may be made by making various combinations of the above-described components or processes, which are also encompassed in the technical scope of the present invention.

First Modification

While the above embodiment is a case where the data processing device 100 executes a convolutional neural network based on VGG-16, the present invention is not limited to this, and the data processing device 100 may execute a convolutional neural network based on another model. The data processing device 100 may execute a convolutional neural network based on a Residual Network having deeper layers and having introduced Identity Mapping (IM), for example. This makes it possible to achieve recognition processing with higher accuracy.

What is claimed is:

1. A data processing method comprising:
applying a first convolutional neural network (CNN), the applying of the first CNN including applying a first convolutional neural network layer to each of pieces of data of a mini-batch including one or more pieces of data and outputting a first feature map of each of the pieces of data;
independently calculating a first statistic of each of the pieces of data included in the mini-batch based on the first feature map of each of the pieces of data;
calculating a normalization parameter for each of the pieces of data included in the mini-batch based on the first statistic of each of the pieces of data and a cumulative statistic;
applying normalization, the applying of the normalization including normalizing the first feature map of each of the pieces of data included in the mini-batch by using the normalization parameter of each of the pieces of data to output a normalized feature map of each of the pieces of data; and
applying a second CNN, the applying of the second CNN including applying a second convolutional neural network layer to the normalized feature map of each of the pieces of data included in the mini-batch and outputting a second feature map of each of the pieces of data.

2. The data processing method according to claim 1, further comprising:
calculating a second statistic based on the first feature map of at least one piece of data out of one or more pieces of data included in the mini-batch; and
updating the cumulative statistic based on the second statistic.

3. The data processing method according to claim 2, wherein the updating of the cumulative statistic includes setting a weighted sum of the second statistic and the cumulative statistic as a new cumulative statistic.

4. The data processing method according to claim 2, wherein the calculating of the second statistic includes calculating a mean and a standard deviation of the first feature map of at least one piece of data, out of the one or more pieces of data included in the mini-batch, as the second statistic.

5. The data processing method according to claim 4, wherein the updating of the cumulative statistic includes setting 0 as an initial value of the cumulative statistic corresponding to the mean, and setting 1 as an initial value of the cumulative statistic corresponding to the standard deviation.

6. The data processing method according to claim 1, wherein:
the mini-batch includes a plurality of pieces of data, and
the plurality of pieces of data included in the mini-batch are assigned to a plurality of processors to achieve parallel execution of processes in the calculating of the first statistic, the calculating of the normalization parameter, and the applying of normalization.

7. The data processing method according to claim 1, further comprising:
acquiring a ground truth for each of the pieces of data included in the mini-batch,
calculating an error of an overall process based on the ground truth of each of the pieces of data included in the mini-batch and the second feature map of each of the pieces of data,
propagating an error, the propagating of the error including calculating, based on the error in the overall process, an error in respective processes in the applying of the first CNN, the applying of normalization, and the applying of the second CNN; and
updating a CNN, the updating of the CNN including updating the first convolutional neural network layer and the second convolutional neural network layer based on the error in each of the processes.

8. The data processing method according to claim 1, wherein the calculating of the normalization parameter includes calculating a rounded statistic difference of each of the pieces of data included in the mini-batch by performing rounding so that a difference or a ratio between the first statistic and the cumulative statistic of each of the pieces of data falls within a predetermined statistic difference range and calculating a normalization parameter of each of the pieces of data based on the first statistic of each of the pieces of data and the rounded statistic difference of each of the pieces of data.

9. The data processing method according to claim 8, wherein the statistic difference range is changed in accordance with a number of times of iterations of a series of processes in each of the applying of the first CNN, the calculating of the first statistic, the calculating of the normalization parameter, the applying of normalization, and the applying of the second CNN.

10. The data processing method according to claim 1, wherein the calculating of the normalization parameter includes calculating the normalization parameter of each of the pieces of data included in the mini-batch based on a weighted sum of the first statistic of each of the pieces of data and the cumulative statistic.

11. The data processing method according to claim 10, wherein weighting of the weighted sum is changed in accordance with a number of times of iterations of processes in each of the applying of the first CNN, the calculating of the first statistic, the calculating of the normalization parameter, the applying of normalization, and the applying of the second CNN.

12. The data processing method according to claim 1, wherein the calculating of the first statistic includes calculating a mean and a standard deviation of the first feature map of each of the pieces of data included in the mini-batch as the first statistic of each of the pieces of data.

13. The data processing method according to claim 1, further comprising:
applying a first CNN for a test data, the applying of the first CNN for the test data including applying the first convolutional neural network layer to the test data and outputting a first feature map of the test data;
setting a normalization parameter, the setting of the normalization parameter including setting the cumulative statistic as the normalization parameter;
applying normalization for a test data, the applying of the normalization for the test data including normalizing the first feature map of the test data by using the normalization parameter and outputting a normalized feature map of the test data;
applying a second CNN for a test data, the applying of the second CNN for the test data including applying the second convolutional neural network layer to the normalized feature map of the test data and outputting a second feature map of the test data; and
processing a test data, the processing of the test data including performing predetermined data processing based on the second feature map of the test data.

14. A data processing device comprising a processor including hardware,
wherein the processor performs processes including:
applying a first convolutional neural network (CNN), the applying of the first CNN including applying a first convolutional neural network layer to each of pieces of data of a mini-batch including one or more pieces of data and outputting a first feature map of each of the pieces of data;
independently calculating a first statistic of each of the pieces of data included in the mini-batch based on the first feature map of each of the pieces of data;
calculating a normalization parameter for each of the pieces of data included in the mini-batch based on the first statistic of each of the pieces of data and a cumulative statistic;
applying normalization, the applying of the normalization including normalizing the first feature map of each of the pieces of data included in the mini-batch by using the normalization parameter of each of the pieces of data and outputting a normalized feature map of each of the pieces of data; and
applying a second CNN, the applying of the second CNN including applying a second convolutional neural network layer to the normalized feature map of each of the pieces of data included in the mini-batch and outputting a second feature map of each of the pieces of data.

15. A non-transitory computer readable medium encoded with a program executable by a computer, the program being executable by the computer to perform processes comprising:
applying a first convolutional neural network (CNN), the applying of the first CNN including applying a first convolutional neural network layer to each of pieces of data of a mini-batch including one or more pieces of data and outputting a first feature map of each of the pieces of data;
independently calculating a first statistic of each of the pieces of data included in the mini-batch based on the first feature map of each of the pieces of data;
calculating a normalization parameter for each of the pieces of data included in the mini-batch based on the first statistic of each of the pieces of data and a cumulative statistic;
applying normalization, the applying of the normalization including normalizing the first feature map of each of the pieces of data included in the mini-batch by using the normalization parameter of each of the pieces of data and outputting a normalized feature map of each of the pieces of data; and
applying a second CNN, the applying of the second CNN including applying a second convolutional neural network layer to the normalized feature map of each of the pieces of data included in the mini-batch and outputting a second feature map of each of the pieces of data.

* * * * *